(12) United States Patent
Shao et al.

(10) Patent No.: US 7,877,514 B2
(45) Date of Patent: Jan. 25, 2011

(54) SYSTEM AND METHOD FOR TIME-CONSTRAINED TRANSMISSION OF VIDEO IN A COMMUNICATION SYSTEM

(75) Inventors: Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 629 days.

(21) Appl. No.: 11/800,123

(22) Filed: May 3, 2007

(65) Prior Publication Data

US 2008/0273554 A1    Nov. 6, 2008

(51) Int. Cl.
G06F 15/16    (2006.01)
(52) U.S. Cl. ....................... 709/245; 709/246
(58) Field of Classification Search ................. 709/203, 709/245–248
See application file for complete search history.

(56) References Cited

U.S. PATENT DOCUMENTS

| | | | |
|---|---|---|---|
| 5,918,002 A * | 6/1999 | Klemets et al. ............... | 714/18 |
| 6,421,387 B1 * | 7/2002 | Rhee ..................... | 375/240.27 |
| 6,804,244 B1 * | 10/2004 | Anandakumar et al. | 370/395.21 |
| 7,072,628 B2 | 7/2006 | Agashe et al. | |
| 7,123,627 B2 | 10/2006 | Kowalski | |
| 7,133,460 B2 * | 11/2006 | Bae et al. .................... | 375/295 |
| 7,170,866 B2 * | 1/2007 | Lee et al. .................... | 370/311 |
| 7,463,892 B2 | 12/2008 | Eiger et al. | |
| 7,580,672 B2 | 8/2009 | Rowitch | |
| 7,613,423 B2 | 11/2009 | Ngo et al. | |
| 7,792,028 B2 | 9/2010 | Huang et al. | |
| 2003/0120802 A1 * | 6/2003 | Kohno ........................ | 709/237 |
| 2003/0206524 A1 * | 11/2003 | Mohanty et al. ............ | 370/236 |
| 2004/0027991 A1 * | 2/2004 | Jang et al. .................... | 370/230 |
| 2004/0266339 A1 | 12/2004 | Larsson | |
| 2005/0058154 A1 * | 3/2005 | Lee et al. ..................... | 370/473 |
| 2005/0237994 A1 * | 10/2005 | Fong et al. .................. | 370/349 |
| 2007/0019591 A1 | 1/2007 | Chou et al. | |
| 2007/0104162 A1 * | 5/2007 | Kneckt et al. ............... | 370/338 |
| 2007/0238482 A1 | 10/2007 | Rayzman et al. | |
| 2007/0266292 A1 | 11/2007 | Korndewal et al. | |
| 2008/0043638 A1 | 2/2008 | Ribiere et al. | |

(Continued)

OTHER PUBLICATIONS

IEEE P802.11e/D13.0, "Amendment: Medium Access Control (MAC) Quality of Service (QoS) Enhancements," Jan. 2005, Institute of Electrical and Electronics Engineers, Inc., pp. 1-198, New York, NY, United States.

(Continued)

*Primary Examiner*—Asad M Nawaz
*Assistant Examiner*—Sargon N Nano
(74) *Attorney, Agent, or Firm*—Kenneth L. Sherman, Esq.; Michael Zarrabian, Esq.; Myers Andras Sherman & Zarrabian LLP

(57) ABSTRACT

A retransmission method and system for time-constrained video packet transmission between a sender and a receiver, wherein the retransmission deadline of each packet is individually adjusted based on the actual decoding time deadline at the receiver decoder. Accordingly, variable retransmission deadlines are set corresponding to the decoding and playback time for each data packet which carries compressed video information. As such, both network efficiency and video transmission quality are improved compared to the conventional retransmission approaches.

67 Claims, 5 Drawing Sheets

U.S. PATENT DOCUMENTS

2009/0059949 A1    3/2009    Singh et al.

OTHER PUBLICATIONS

Gesbert, D. et al., "Technologies and Performances for Non-Line-of-Sight Broadband Wireless Access Networks," IEEE Communications Magazine, Apr. 2002, pp. 86-95, United States.

Zheng, L. et al., "Diversity and Multiplexing: A Fundamental Tradeoff in Multiple-Antenna Channel," IEEE Transaction on Information Theory. vol. 49, No. 5, May 2003, pp. 1073-1096, United States.

Foschini, G.J., "Layered Space-Time Architecture for Wireless Communication in a Fading Environment When Using Multi-Element Antennas." Bell Labs Technical Journal, Autumn 1996, pp. 41-59, United States.

U.S. Non-final Office Action for U.S. Appl. No. 10/938,374 mailed Dec. 8, 2006.

U.S. Final Office Action for U.S. Appl. No. 10/938,374 mailed Jun. 1, 2007.

U.S. Non-final Office Action for U.S. Appl. No. 10/938,374 mailed Dec. 12, 2007.

U.S. Final Office Action for U.S. Appl. No. 10/938,374 mailed May 27, 2008.

U.S. Advisory Action for U.S. Appl. No. 10/938,374 mailed Sep. 6, 2007.

U.S. Advisory Action for U.S. Appl. No. 10/938,374 mailed Aug. 14, 2008.

U.S. Notice of Allowance for U.S. Appl. No. 10/938,374 mailed Jan. 30, 2009.

U.S. Notice of Allowance for U.S. Appl. No. 10/938,374 mailed Jul. 24, 2009.

U.S. Non-final Office Action for U.S. Appl. No. 11/897,063 mailed Nov. 16, 2009.

International Standard ISO/IEC 13818-2:2000, "Information Technology—Generic Coding of Moving Pictures and Associated Audio Information," Joint Technical Committee, ISO/IEC, Mar. 1, 2002, pp. 1-4, Switzerland.

U.S. Non-final Office Action for U.S. Appl. No. 11/897,063 mailed Jun. 10, 2010.

802.11 Working Group of the 802 Committee, "Draft Amendment to Standard for Information Technology-Telecommunications and information exchange between systems—Local and metropolitan area networks—Specific requirements—Part 11: Wireless LAN Medium Access Control (MAC) and Physical Layer (PHY) specifications: Enhancements for Higher Throughput," IEEE P802.11n/D1.0, Mar. 2006, pp. 1-335.

The International Organization for Standardization et al., "Information technology—Generic coding of moving pictures and associated audio information: Systems," International Standard ISO/IEC 13818-1, Dec. 1, 2000, pp. 1-174.

IEEE Wireless LAN Edition, "A compilation based on IEEE Std 802.11TM—1999 (R2003) and its amendments," IEEE Standards Information Network, Sep. 19, 2003, IEEE Press, pp. 1-706.

Stephens, A. et al., "Joint Proposal: High throughput extension to the 802.11 Standard: MAC," IEEE P802.11, Wireless LANs: IEEE 802.11-05/1095r2, Nov. 16, 2005, pp. 1-37.

\* cited by examiner

200

SYSTEM AND METHOD FOR TIME-CONSTRAINED TRANSMISSION OF VIDEO IN A COMMUNICATION SYSTEM

FIELD OF THE INVENTION

The present invention relates to transmission of video signals, and in particular to time-constrained transmission and retransmission of video packets in a communication network.

BACKGROUND OF THE INVENTION

In packet transmission between a sender and a receiver in a communication network, data packets can be lost or suffer bit errors during transmission on an un-reliable link such as communication channel in wireless local area network (WLAN) environments. In such circumstances, retransmission of lost or damaged packets from the sender to the receiver is required.

Conventionally, there are mainly two approaches for retransmission of data packets that are lost or not received at a receiver correctly. One approach involves retransmitting the data packet from the sender repeatedly until the maximum retry limit is reached. Another retransmission approach involves setting a fixed time deadline for retries such that any number of retransmissions by the sender can only be performed before that time deadline. After the time deadline, the sender will not retransmit a data packet, even if the receiver has not received the data packet correctly. A combination of the above two approaches is possible, wherein retransmission stops whenever either a maximum retry limit, or the time deadline, is reached.

However, since video transmission has inherent time constraints in terms of playback at the receiver, the above retransmission approaches prove problematic. Repeated retransmission of a data packet for video traffic until reaching the maximum retry limit is not effective if the retransmitted packet misses the receiver's time limit for decoding and playback. Such useless retransmission wastes network bandwidth.

Further, setting a fixed deadline for retries is inadequate for transmission of compressed video such as MPEG2. This is because picture frames need to be displayed constantly (25 or 30 frames/second as an example) after being decoded. However, the frame sizes of the compressed video sequence are variable, which means that variable transmission times are needed for different frames. For example, I-frames of MPEG2 can be 10 to 100 times larger than P-frames or B-frames. I-frames need much more time to be transmitted than B-frames or P-frames. Moreover, it is common that one Media Access Control (MAC) packet cannot carry a whole MPEG2 frame. If a MPEG2 frame is segmented into different MAC packets, their allowed retransmission duration may be quite different because the segments have the same decoding and playback deadline, but were transmitted at different times.

If the fixed retransmission deadline is longer than the actual allowed retransmission duration, network bandwidth is wasted due to useless retransmission. If the fixed retransmission deadline is shorter than the actual allowed retransmission duration, video transmission quality may be degraded since more retransmissions are needed to help recover packet error after the retransmission deadline, but before the decoding and playback deadline. There is, therefore, a need for a method and system for time-constrained transmission and retransmission of video packets in a communication network.

BRIEF SUMMARY OF THE INVENTION

The present invention provides a retransmission method and system for video packet transmission between a sender and a receiver, which individually adjusts the retransmission deadline of each packet according to the actual decoding time deadline at the receiver decoder.

Variable retransmission deadlines are set corresponding to the decoding/playback time for each data packet which carries compressed video information. As such, both network efficiency and video transmission quality are improved compared to the conventional retransmission approaches.

These and other features, aspects and advantages of the present invention will become understood with reference to the following description, appended claims and accompanying figures.

DETAILED DESCRIPTION OF THE INVENTION

Figure 1:
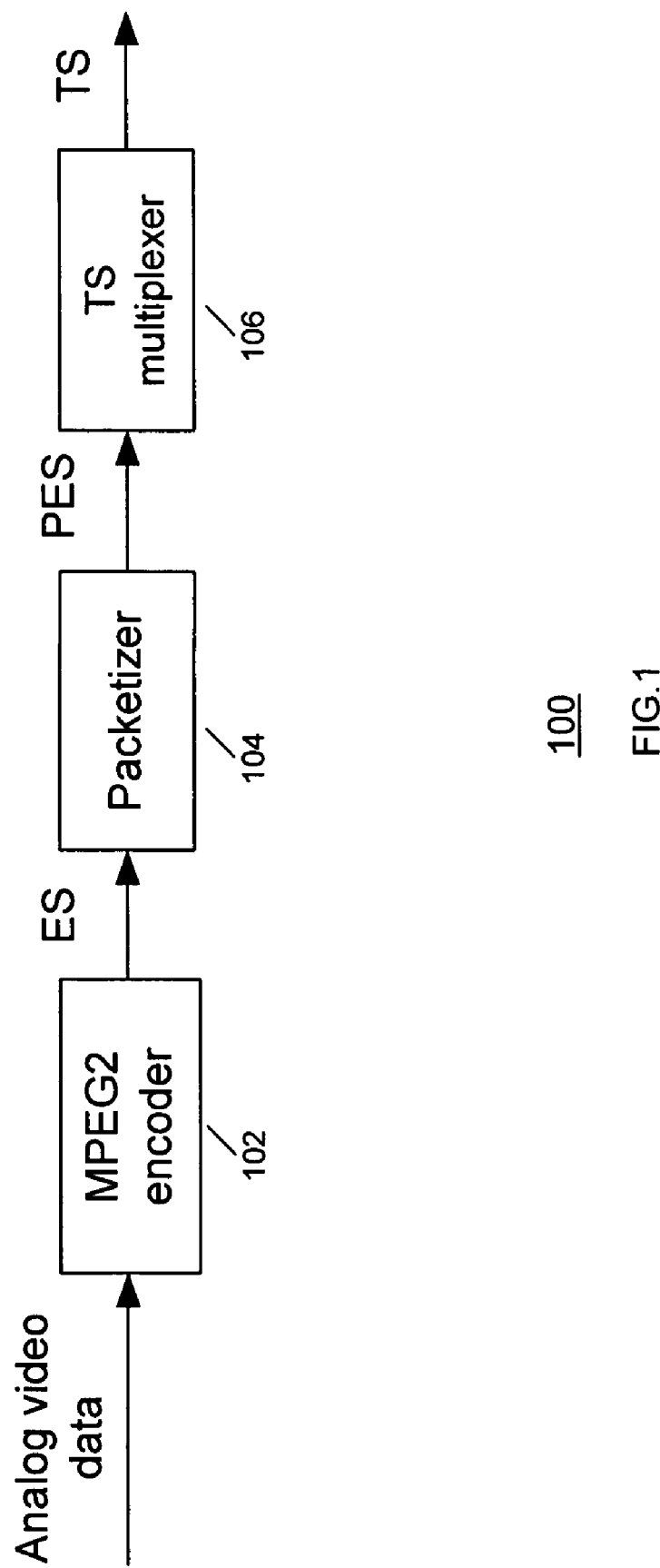
FIG. 1 shows a functional block diagram for construction of a MPEG2 transport stream.

The present invention provides a method and system implementing a process for communication of time-constrained video packets between a sender and a receiver in a communication network. In one embodiment, the communication process individually adjusts the retransmission deadline of each packet (e.g., a MAC packet including video information payload), according to the actual decoding time deadline at the receiver decoder. Accordingly, variable retransmission deadlines are set corresponding to the decoding/playback time for each data packet which carries video information including compressed video. As such, both network efficiency and video transmission quality are improved compared to the conventional retransmission approaches.

An example in implementation of the present invention for a WLAN utilizing an IEEE 802.11n communication protocol is now described. The IEEE 802.11n protocol is described in IEEE P802.11n/D1.0 Draft Amendment to STANDARD [FOR] Information Technology-Telecommunications and information exchange between systems-Local and Metropolitan networks-Specific requirements-Part 11: Wireless LAN Medium Access Control (MAC) and Physical Layer (PHY) specifications: Enhancements for Higher Throughput, March 2006, incorporated herein by reference.

The IEEE 802.11n MAC packet and aggregation format can be used as is. The sender and the receiver implement a frame structure for data transmission therebetween, using packet transmission in a MAC layer and a physical (PHY) layer. The MAC layer of the sender receives a data packet including payload data, and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the sender (e.g., access point (AP)) to attach a PHY header (i.e., PHY preamble) thereto to construct a PHY Protocol Data Unit (PPDU). The PHY header includes parameters for determining a transmission scheme including a coding/modulation scheme. Typically, the most reliable coding/modulation scheme is applied to a PHY signal field in the PHY header, and an additional cyclic redundancy check (CRC) is added to ensure this information is received correctly at the receiver. The MAC header and payload data are usually treated equally and transmitted using the same coding/modulation scheme, which is less robust than that for the PHY signal field of the PHY header. Further, before transmission as a packet, a preamble is attached to the PPDU, which can include channel estimation and synchronization information.

No timestamp information is required in the MAC header or in the aggregation delimiters of an aggregated MSDU (A-MSDU) or an aggregated MPDU (A-MPDU). The example implementation is described in conjunction with HD video signals using MPEG2 encoding. Specifically, first an overview of the MPEG2 transport stream construction is provided, and then an adaptive retransmission process for time-constrained data packets in conjunction with HD video signals using MPEG2 encoding, according to an embodiment of the present invention, is described.

MPEG2 Transport Stream Construction

Figure 2:
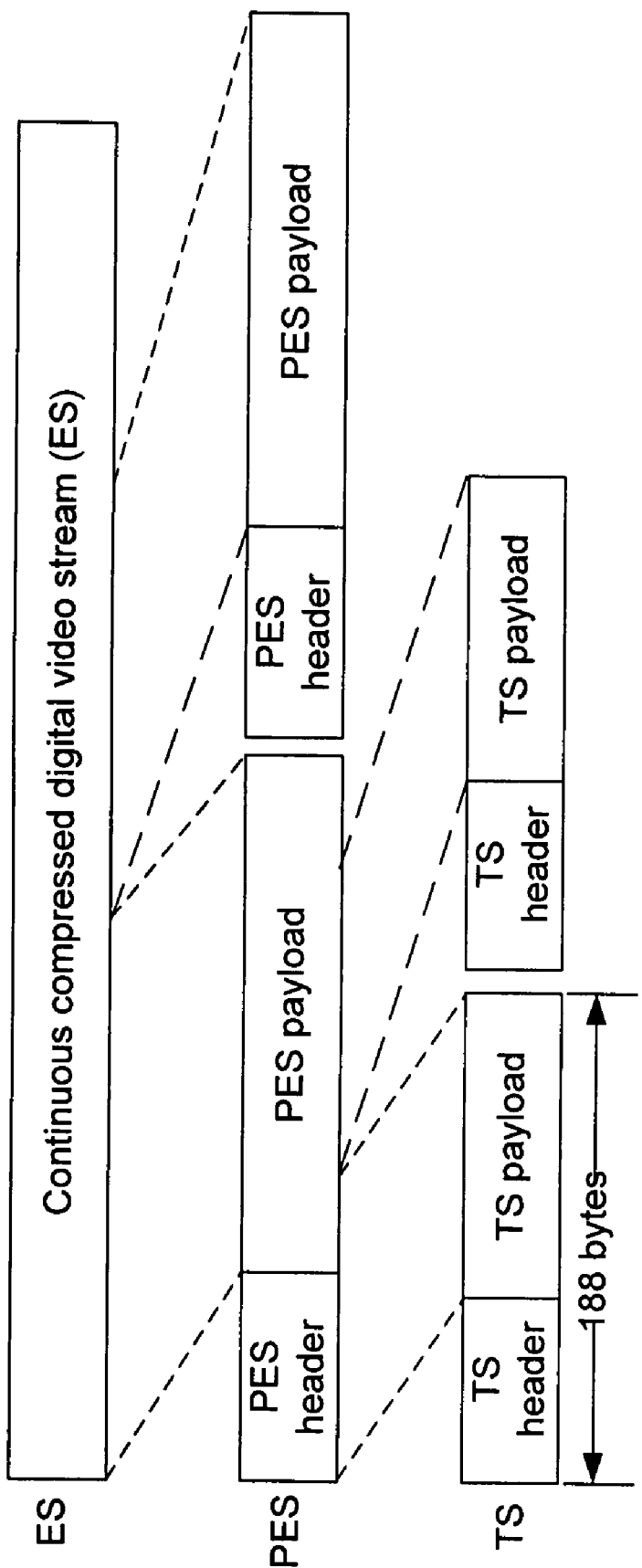
FIG. 2 shows a diagrammatical example of constructing MPEG2 transport stream (TS) packets.

HD television (HDTV) broadcasting uses the Advanced Television Systems Committee (ATSC) standard. ATSC HDTV video employs the MPEG2 standard with some constraints. Specifically, ATSC HDTV uses a transport stream (TS) format specified in the MPEG2 standard. As shown in the functional block diagram of a conventional sender (transmitter) 100 in FIG. 1, according to the MPEG2 specification, a MPEG2 video encoder 102 receives analog video data and generates a compressed video stream, termed elemental stream (ES). FIG. 2 shows a diagram 200 of an example conventional TS packet construction. A video ES comprises all of the video data for a sequence, including the sequence header and all of the subparts of a sequence. An ES carries only one type of data (video or audio) from a single video or audio encoder.

After the encoder 102 (FIG. 1), the ES is packetized by a packetizer 104, generating a packetized elemental stream (PES). The PES comprises a single ES that has been converted into packets, each packet starting with an added packet header. A PES stream includes only one type of data from one source, e.g., from one video or audio encoder.

PES packets have variable lengths which do not correspond to the fixed packet lengths of transport packets. Indeed, each PES packet may be much longer than a transport packet. When transport packets are formed from a PES packet, the PES packet header is always placed at the beginning of a transport packet payload, immediately following the transport packet header. The remaining PES packet content fills the payloads of successive transport packets until the PES packet is full. The final transport packet is filled to a fixed length by padding it with bytes=0xFF (all ones), as necessary. The different transport packets are then multiplexed by a TS multiplexer 106.

Each PES packet header includes an 8-bit stream ID identifying the source of the payload. The PES packet header may further include timing references, such as: a Presentation Time Stamp (PTS) which indicates the sender-selected time at which a decoded audio or video access unit is to be presented by the decoder; a Decoding Time Stamp (DTS) which indicates the time at which an access unit is decoded by the decoder; an Elemental Stream Clock Reference (ESCR); etc.

The ATSC standard further constrains PES packets for video. Every video PES packet starts with the beginning of a video access unit. For terrestrial broadcast, each PES packet includes no more than one coded video frame (and may contain one or two coded fields or one frame). Every PES header includes a PTS. A PES packet devoid of video information must include a discontinuity_indicator to signal that a continuity_counter may be discontinuous.

The MPEG protocol packages all data into fixed-size 188-byte TS packets for transport. Video or audio payload data may be placed in a PES packet before the PES packet is segmented into fixed length transport packet payloads. Each transport packet starts with a sync byte=0x47. In the ATSC US terrestrial DTV VSB transmission system, the sync byte is not processed, but is replaced by a different sync symbol especially suited to radio frequency (RF) transmission. The transport packet header includes a 13-bit PID (packet ID), which corresponds to a particular ES of video, audio, or other program element.

Adaptive Retransmission Scheme for Time-Constrained Data Packets

In a system for communication of compressed video such as MPEG2 video, picture/image frames should be played back at the receiver continuously (e.g., 25 or 30 frames/second) after being decoded. However, as described, since the frame sizes of compressed video sequences are variable, variable transmission times for different frames are utilized. It is common that one MAC packet cannot carry a whole MPEG2 frame. If a MPEG2 frame is segmented to different MAC packets, the allowed retransmission duration of each MAC packet may be quite different. This is because the segments have the same decoding and playback deadline but were transmitted at different times.

In a communication process according to the present invention, if retransmitting a packet will not result in arrival of the packet at the receiver by the playback (i.e., decoding/presentation) deadline of the receiver decoder, then that packet is not retransmitted by the sender. For each MAC packet carrying MPEG2 video information, the MAC packet retransmission deadline is set to the required decoding and presentation time (Td) of the video frame to which the MAC packet belongs, minus the transmission time (Tp) of the MAC packet. The Tp of a MAC packet (header and payload) can be determined as: the sum of a PHY header transmission time and the ratio of a MAC packet length to data rate, such that Tp=the PHY header transmission time+(MAC packet length divided by the data rate). The data rate is the selected transmission data rate for the MAC packet.

The time Td for the video frame to which the MAC packet belongs, is determined as follows. For MPEG2 standardization, the receiver follows the playback deadline set by the sender (i.e., PTS time) in the PES header. As such, Td is a function of PTS. Based on the ATSC HDTV standard, every coded video frame should be carried in one or several separated PES packets. Further, PTS information must be carried in every PES header. Therefore, the sender can obtain the PTS information for every video frame if it can parse the PES header, such that: Td=PTS+Tos, wherein Tos is the time offset between the starting time when the beginning of the video sequence is encoded, and the starting time when the beginning of the compressed video sequence is passed to the MAC layer of the communication component of the sender. Timestamps at the first PES packet and/or TS packet carry information indicating the starting time when the beginning of the video sequence is encoded.

Tos may be set to zero in case of live video encoding and transmission. If a video sequence is pre-encoded and pre-packaged into PES and TS streams, Tos is a fixed value reflecting the time difference between encoding and transmission. If the communication component can directly obtain a PES stream from applications and packetize the PES stream into MAC packets, the PTS information can be obtained by parsing the PES header. However, typically the communication component of the sender can only obtain a TS stream from applications. The PES header is encapsulated into the payload field of the TS packet and cannot be directly accessed by the communication component by parsing the TS header.

A bit in the TS header (i.e., payload start indicator bit) indicates the start of a PES packet for the current TS packet. Further, the PES header is always placed in the TS packet with a payload start indicator set to "1". Therefore, the sender can parse the payload information of the TS packets with a payload start indicator setting to "1" to obtain the PTS of the video frame to which the TS packet belongs. Multiple TS packets belonging to the same PES can be aggregated into one MAC packet. The communication component can set the retransmission deadline of the MAC packet according to the PTS information of the corresponding PES packet.

Further, in some video transmission implementations, an amount of buffering for video pre-loading is allowed to compensate delay jitter and packet corruption caused by unreliable transmission channel. The required decoding and presentation time, of the video frame to which the MAC packet belongs, is denoted as Td. The time Td for a video frame may be later than the nominal decoding and PTS. The gap between these two times (Td−PTS), is denoted as Δb.

At the receiver, Δb is calculated by subtracting PTS of the most current video frame from the actual starting time of decoding and presentation time, Td, of the same video frame. The value of Δb is fed back to the sender regularly to adjust the retransmission deadline of the packets belonging to the succeeding video frames. The sender uses Δb to estimate the maximum allowed receiver buffering time of a MAC packet before being decoded. With this estimation, the sender can set the retransmission deadline of a MAC packet more accurately.

Process for Transmission and Retransmission of MPEG2 TS Streams

An example implementation of a process for transmission and retransmission of MPEG2 TS streams between a sender and a receiver, according to the present invention, is described below. It is assumed that system clocks between the sender and the receiver are time synchronized with one another.

Figure 3:
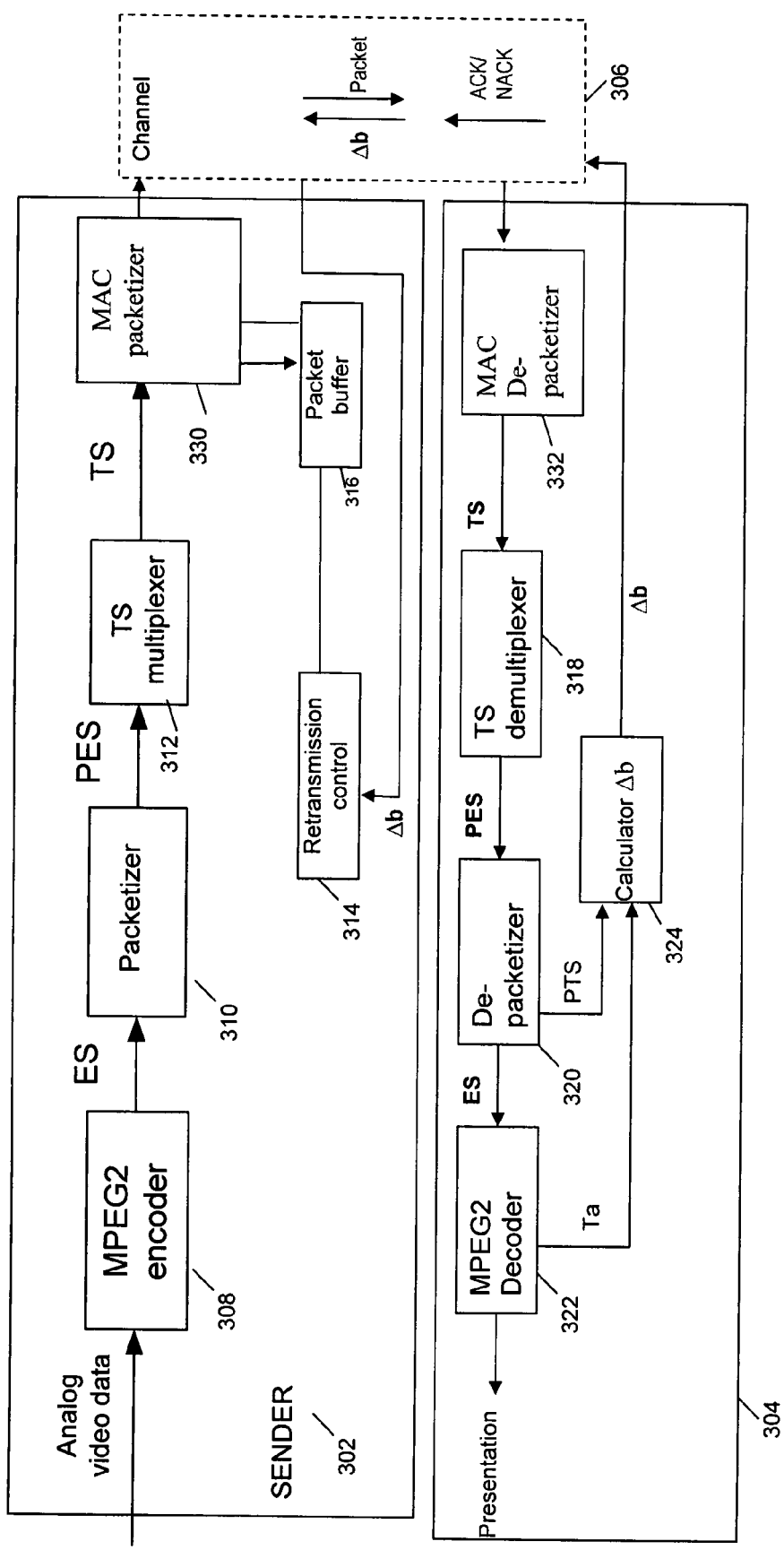
FIG. 3 shows a functional block diagram of a system for time-constrained retransmission for MPEG2 high definition (HD) video content, according to an embodiment of the present invention.

FIG. 3 shows a functional block diagram of an example system 300 implementing an embodiment of the present invention, including a sender 302 and a receiver 304 that transmit packets via a communication channel 306 (e.g., wireless channel implementing the IEEE 802.11n communication protocol). The sender 302 includes: a MPEG2 encoder 308, a packetizer 310, a TS multiplexer 312, a MAC packetizer 330, a retransmission control 314 and a packet buffer 316. The receiver 304 includes: a MAC de-packetizer 332, a TS demultiplexer 318, a de-packetizer 320, a MPEG2 decoder 322, and a Δb calculator 324. In this example, the sender 302 places the MPEG2 TS streams into the MAC frames and sends the MAC frames to the receiver 304.

Figure 4:
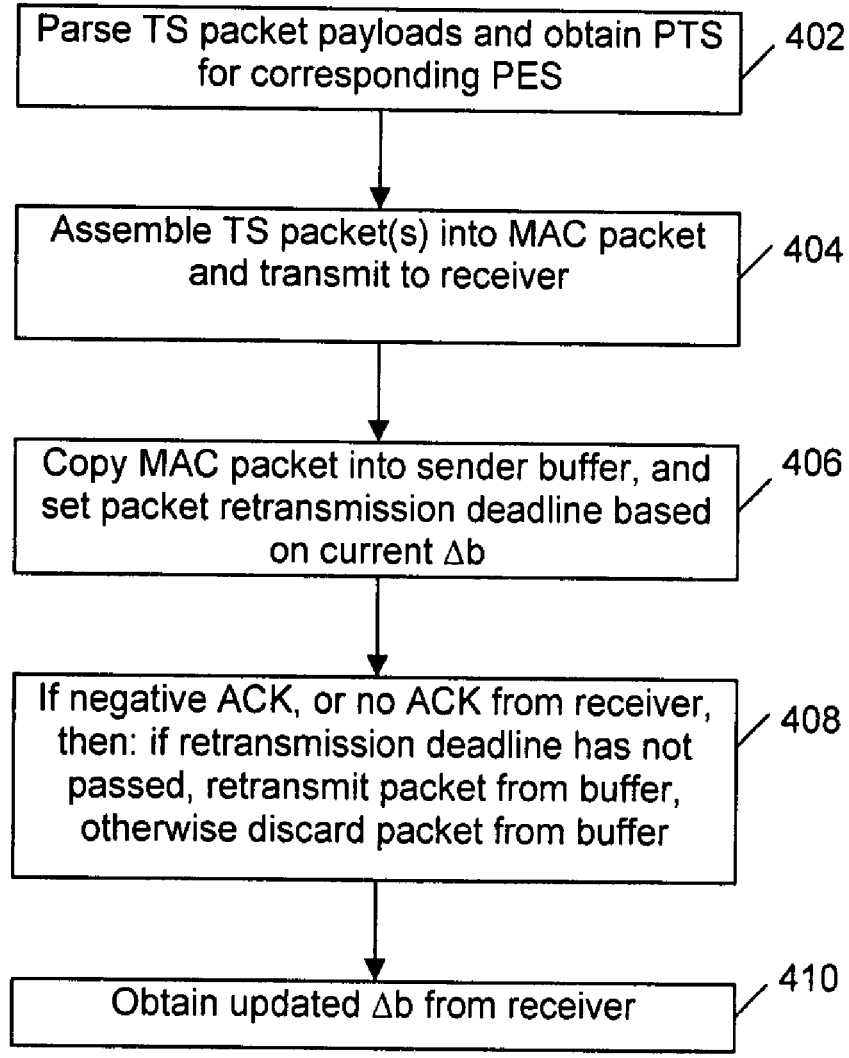
FIG. 4 shows an example flowchart of the steps of a communication process implemented by the sender in the system FIG. 3, according to an embodiment of the present invention.

The sender 302 and the receiver 304 implement a method of time-constrained retransmission for MPEG2 HD content according to the processes 400 and 500 represented by the flowcharts in FIGS. 4 and 5, respectively, as described below. Initially, the MPEG2 encoder 308 encodes the incoming analog video data into ES data, the packetizer 310 converts the ES data payload into PES packets, and the TS multiplexer 312 generates MPEG2 TS packets. Referring to the process 400 in FIG. 4, the sender 302 implements the following further steps:

Step 402: The MAC packetizer 330 parses the payload of TS packets with payload start indicator setting to "1", and obtains the PTS of the corresponding PES. For the first PES/TS of the video sequence, in addition to PTS information, the sender also obtains System Clock Reference (SCR) and/or Program Clock Reference (PCR) information. Tos can then be calculated as the difference between SCR and the starting transmission time of the first TS packet. If pre-loading is allowed, the initial Δb is set to the pre-loading time plus Tos. Usually the pre-loading duration is chosen between 100 ms and 10 seconds decided by the video transmission application.

Step 404: The MAC packetizer 330 assembles one or multiple TS packets into a MAC packet and transmits each MAC packet to the receiver via the communication channel 306.

Step 406: The sender 302 maintains a copy of the MAC packet at its sending buffer 316 before the sender 302 receives a positive acknowledgement indicating that the MAC packet arrived at the receiver 304 correctly. The sender sets the retransmission deadline of a MAC packet to: PTS+Δb−Tp. Different MAC packets belonging to the same video frame have the same retransmission deadline (i.e., PTS+Δb−Tp), even though their starting transmission times are different. The retransmission deadline of all MAC packets in the same video frame is dynamically updated when the sender receives a new value of Δb fed back from the receiver. Since for MPEG2 the decoding of a current P-frame, or B-frame, refers to its pervious I-frame, the data of a compressed I-frame is useful for the following B-frame or P-frame even if the current I-frame data already missed the decoding deadline upon arrival at the receiver. When the data misses the decoding deadline of the receiver, the deadline of a MAC packet is set to: PTS+Δb−Tp+1/f, wherein f is the frame rate for the video playback. As such, in that case, the retransmission deadline is extended by 1/f (one frame time) to allow processing of following B-frame or P-frame.

Step 408: If the sender 302 receives a negative acknowledgement (ACK) indicating that the receiver 304 did not receive the MAC packet correctly, or the retransmission timeout is triggered before receiving any acknowledgement (e.g., receiver did not send any ACK), the retransmission control 314 checks the retransmission deadline of the MAC frame to determine if there is time left to retransmit the MAC packet. If the retransmission deadline cannot be met, then the sender ceases attempts to retransmit the MAC packet. As far as buffering status at the sender is concerned, the sender retransmits a copy of the MAC packet to the receiver if the sender determines that it can perform the retransmission before the retransmission deadline. Otherwise, the sender removes the copy of the MAC packet from the buffer 316 and ceases retransmission attempts of that MAC packet.

Step 410: After the sender 302 obtains an updated Δb feedback from the receiver 304, the retransmission control 314 updates the Δb value for future MAC packet transmission and retransmissions.

Figure 5:
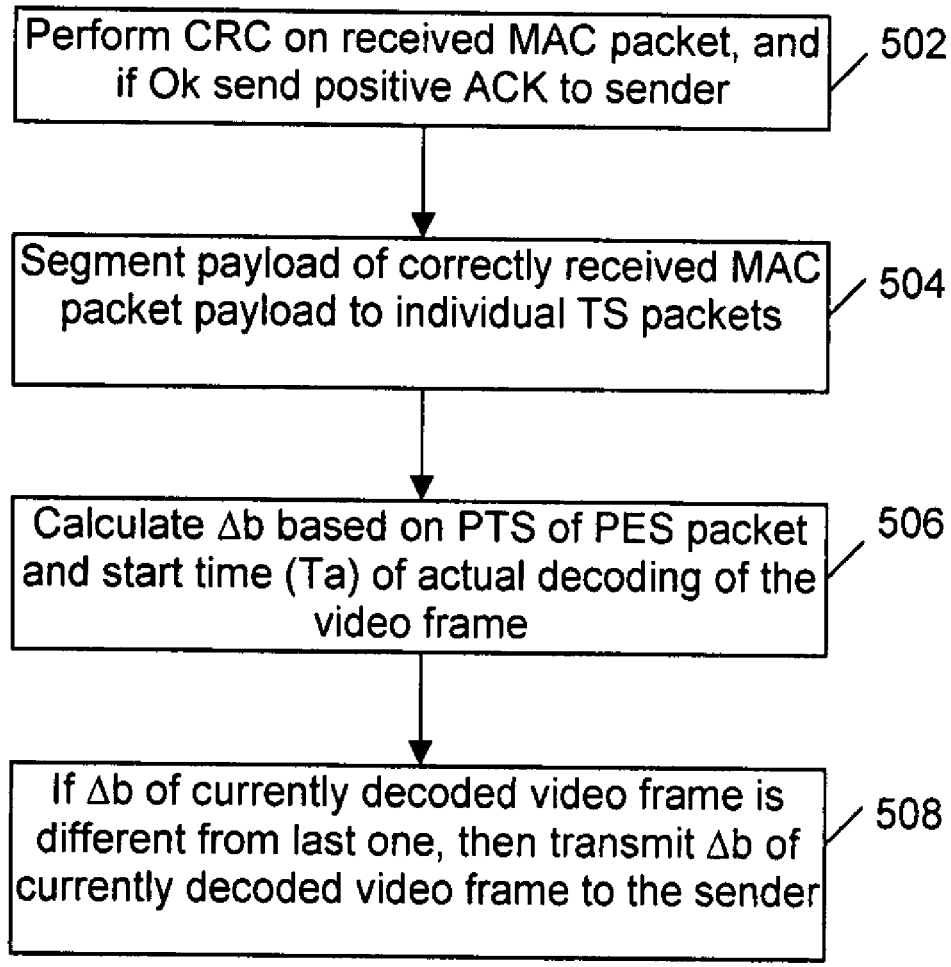
FIG. 5 shows an example flowchart of the steps of a communication process implemented by the sender in the system FIG. 3, according to an embodiment of the present invention.

Referring to the flowchart 500 in FIG. 5, the sender 302 implements the following steps:

Step 502: When the receiver 304 receives a MAC packet from the sender 302 via the channel 306, the MAC de-packetizer 332 performs error detection (e.g., CRC verification) for the received MAC packet. If no errors are detected, the receiver sends back a positive acknowledgement (PACK) to the sender. Otherwise, the receiver sends back a negative acknowledgement (NACK), or no acknowledgement, to the sender, depending on the acknowledgement mechanism being used. A received MAC packet with an incorrect CRC check may or may not be used.

Step 504: After obtaining the received MAC packet payload with a correct CRC check, the MAC de-packetizer 332 segments the payload to individual TS packets. Then, the TS demultiplexer 318 can re-assemble the PES stream from payload of TS packets.

Step 506: When a PES packet is generated from TS packets by the TS demultiplexer 318, and the PES packet is ready to be passed to the video decoder 322 at the receiver, the PTS of the PES packet is recorded. The de-packetizer 320 is used to recover ES data from PES packets, wherein the ES data stream is provided to the decoder 322. Further, the start time (Ta) of actual decoding of the video frame is recorded. The recorded PTS and the recorded start time (Ta) of actual decoding are used by the $\Delta b$ calculator 324 to calculate a new $\Delta b$ as: $\Delta b = Ta - PTS$. The values Td and PTS are indicative of the occupation level of a receive buffer at the receiver.

Step 508: If the $\Delta b$ of the currently decoded video frame is different from $\Delta b$ of the previous video frame, the receiver sends back an updated value of $\Delta b$ to the sender, for example piggybacked with other MAC packets such as ACK packets.

In the above example, $\Delta b$ is calculated at the receiver by subtracting PTS of the most current video frame from the actual starting decoding and presentation time Td of the same video frame. The sender then sets the retransmission deadline of its MAC packet to: $PTS + \Delta b - Tp$. An alternative scheme for the sender is to set the retransmission deadline of its MAC packet to: $PTS + \Delta b' - Tp$, wherein $\Delta b'$ is the average of $\Delta bs$ of the recent video frames decoded.

MPEG Header Tables

In Tables 1 and 2 below, MPEG header tables are provided for reference.

TABLE 1

Transport stream packet header

| Item Name | Description | Bits |
| --- | --- | --- |
| Sync byte | Synchronization code of value 0x47 | 8 |
| Transport error indicator | When set, at least one bit error is present in the packet | 1 |
| Payload start indicator | When set, the payload of this transport packet is the start of a PES packet | 1 |
| Transport priority | Used by the decoder | 1 |
| PID | Identifies which PES the data stored in this transport packet payload is from | 13 |
| Scrambling control | Scrambling mode | 2 |
| Adaptation field control | Indicate if there is an adaptation field (additional information) following the transport stream header 01: no adaptation field, payload only 10: adaptation field only, no payload 11: adaptation field followed by payload 00: RESERVED for future use | 2 |
| Continuity counter | 4 bit counter which increments with each transport packet containing the same PID, when it reaches 15 it loops back to zero | 4 |

TABLE 2

Packetized elemental stream header

| Item | Description | Bits |
| --- | --- | --- |
| Start code | 0x000001 | 24 |
| Stream ID | Stream identifier | 8 |
| PES packet length | Length of the packet, for video it is not specified | 16 |
| Sync code | '10' | 2 |
| PES scrambling control | Scrambling flags | 2 |
| PES priority | Used by the decoder | 1 |
| Data alignment indicator | Used by the decoder | 1 |
| Copyright | When set, PES packet payload is protected by copyright | 1 |
| Original or copy | When set, PES packet payload is an original | 1 |
| PTS DTS flags | 10: PTS fields are present in the PES packet header 11: PTS and DTS fields are present in the PES packet header 00: no PTS or DTS fields are present in PES packet header | 2 |
| ESCR flag | When set, ESCR fields are present in the PES packet header | 1 |
| ES rate flag | When set, an ES rate field is present in the PES packet header | 1 |
| DSM trick mode flag | When set, a DSM trick mode field is present | 1 |
| Additional copy info flag | When set, an additional copy field is present in the PES packet header | 1 |
| PES CRC flag | When set, a CRC field is present in the PES packet header | 1 |

TABLE 2-continued

Packetized elemental stream header

| Item | Description | Bits |
|---|---|---|
| PES extension flag | When set, an extension field is present in the PES packet header | 1 |
| PES header data length | Total number of bytes occupied by the additional fields and any stuffing bytes in this PES packet header | 8 |
| Additional header data | Depending on the flags above, more headers may follow. The length of this section is set by the PES header data length field | |

The retransmission method and system for time-constrained video packet transmission between a sender and a receiver, provides that the retransmission deadline of each packet is individually adjusted based on the actual decoding time deadline at the receiver decoder. Accordingly, variable retransmission deadlines are set corresponding to the decoding and playback time for each data packet which carries compressed video information. As such, both network efficiency and video transmission quality are improved compared to the conventional retransmission approaches.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of time-constrained video packet transmission between a sender and a receiver via a communication channel, comprising:
    transmitting encoded video packets from the sender to the receiver including:
        encoding video information into an elemental stream (ES);
        packetizing the ES stream into packetized ES (PES) packets;
        generating transport stream (TS) packets from each PES packet, wherein each TS packet includes an encoded video payload;
        obtaining a presentation time stamp (PTS) indicating the time when each TS packet payload is to be decoded at the receiver; and
        assembling the TS packets with PTS, into each media access control (MAC) packet, and transmitting each MAC packet to the receiver; and
    selecting a retransmission deadline for each packet based on an actual decoding time deadline determined at the receiver.

2. The method of claim 1 further including:
    retransmitting a packet to the receiver only before the corresponding retransmission deadline.

3. The method of claim 2 wherein transmitting encoded video packets to the receiver further includes transmitting media access control (MAC) packets to the receiver.

4. The method of claim 3 further including:
    selecting a retransmission deadline for each MAC packet based on a difference between: (a) the required decoding and presentation time Td of a video frame to which the MAC packet belongs, and (b) the transmission time Tp of the MAC packet.

5. The method of claim 4 wherein transmitting encoded video packets from the sender to the receiver further comprises:
    MPEG2 encoding video information into an elemental stream (ES);
    packetizing the ES stream into packetized ES (PES) packets;
    generating transport stream (TS) packets from each PES packet, wherein each TS packet includes encoded video payload;
    obtaining a presentation time stamp (PTS) indicating the time when each TS packet payload is to be decoded at the receiver; and
    assembling the TS packets with PTS, into each MAC packet, and transmitting each MAC packet to the receiver.

6. The method of claim 5 further including determining a transmission time, Tp, of each MAC packet as the sum of a PHY header transmission time and the ratio of the MAC packet length to transmission data rate.

7. The method of claim 6 further including determining the required decoding and presentation time Td as a function of PTS.

8. The method of claim 7 further including determining the required decoding and presentation time Td as:

$Td=PTS+Tos,$ wherein Tos is the time offset between the starting time when the beginning of the video frame sequence is encoded, and the starting time when the beginning of the compressed video frame sequence is passed to a MAC communication component of the sender.

9. The method of claim 1 further comprising:
    detecting a need for retransmission a packet to the receiver; and
    retransmitting the packet to the receiver only before the corresponding retransmission deadline.

10. The method of claim 9 wherein the retransmission deadline for each packet varies based on a corresponding receiver decoding time for each packet that carries encoded video information.

11. The method of claim 10 wherein transmitting-encoded video packets to the receiver further includes transmitting MAC packets to the receiver.

12. The method of claim 11 wherein selecting a retransmission deadline further includes:
    selecting a retransmission deadline for each MAC packet based on a difference between an actual decoding time deadline determined at the receiver of a video frame and a nominal decoding time.

13. The method of claim 12 further including:
at the receiver, determining a difference between: (a) the actual decoding and presentation time of a video frame to which the MAC packet belongs and (b) the transmission time Tp of the MAC packet, for a current video frame;
transmitting said difference to the sender; and
at the sender, selecting the retransmission deadline for each MAC packet of a video frame based on the difference.

14. The method of claim 13 further including:
the receiver transmitting said difference to the sender, only if the difference is not the same as that for the previous video frame.

15. The method of claim 11 further including:
placing a copy of each MAC packet in a sender buffer, and retransmitting the packet from the buffer to the receiver only before the corresponding retransmission deadline.

16. The method of claim 15 further including:
upon receiving each packet, the receiver verifying correctness of the packet; and
the receiver sending a positive ACK back to the sender only upon receiving each correct packet.

17. The method of claim 16 wherein detecting a need for retransmission of a packet to the receiver further includes: the sender not receiving an ACK from the receiver.

18. The method of claim 17 further including:
retransmitting the packet to the receiver only before the corresponding retransmission deadline, and if the retransmission deadline has passed, discarding the packet from the buffer.

19. The method of claim 9 wherein selecting a retransmission deadline for each packet further includes:
determining an average of said difference for the recent video frames decoded; and
selecting a retransmission deadline for each packet as function of said average.

20. The method of claim 1 wherein the sender and the receiver implement a wireless local area network protocol.

21. The method of claim 20 wherein the sender and the receiver implement a type of IEEE 802.11 communication protocol.

22. The method of claim 21 wherein the sender and the receiver implement a type of IEEE 802.11n communication protocol.

23. A video communication system, comprising:
a processor;
a sender configured for transmitting video information over a communication link; and
a receiver configured for receiving the video information over the communication link;
wherein the sender includes:
a packet sender configured for transmitting encoded video packets to the receiver over the communication link including;
encoding video information into an elemental stream (ES);
packetizing the ES stream into packetized ES (PES) packets;
generating transport stream (TS) packets from each PES packet, wherein each TS packet includes an encoded video payload;
obtaining a presentation time stamp (PTS) indicating the time when each TS packet payload is to be decoded at the receiver; and
assembling the TS packets with PTS, into each media access control (MAC) packet, and transmitting each MAC packet to the receiver; and
a retransmission controller configured for selecting a retransmission deadline for each packet based on an actual decoding time deadline determined at the receiver, for controlling the packet sender for packet retransmissions, and for selecting retransmission deadlines that vary based on a corresponding receiver decoding time for each packet that carries encoded video information;
wherein the sender and the receiver implement time-constrained video packet communication therebetween.

24. The system of claim 23 wherein the retransmission controller is further configured for controlling the packet sender for retransmitting a packet to the receiver only before the corresponding retransmission deadline.

25. The system of claim 24 wherein the retransmission controller is further configured for selecting a retransmission deadline for each MAC packet based on a difference between: (a) the required decoding and presentation time Td of a video frame to which the MAC packet belongs, and (b) the transmission time Tp of the MAC packet.

26. The system of claim 25 wherein:
the sender further comprises:
an encoder configured to perform MPEG2 encoding video information into the ES;
a PES packetizer configured for packetizing the ES stream into PES packets;
a multiplexer configured for generating the TS packets from each PES packet, wherein each TS packet includes encoded video payload;
the packet sender is further configured for selecting the PTS indicating the time when each TS packet payload is to be decoded at the receiver
the packet sender is further configured for assembling the TS packets with PTS, into each MAC packet, and transmitting each MAC packet to the receiver.

27. The system of claim 26 wherein the packet sender is further configured for determining a transmission time Tp of each MAC packet as the sum of a PHY header transmission time and the ratio of the MAC packet length to transmission data rate.

28. The system of claim 27 wherein the packet sender is further configured for determining the required decoding and presentation time Td as a function of PTS.

29. The system of claim 28 wherein the packet sender is further configured for determining Td as:

$Td = PTS + Tos,$ wherein Tos is the time offset between the starting time when the beginning of the video frame sequence is encoded, and the starting time when the beginning of the compressed video frame sequence is passed to a MAC communication component of the sender.

30. The system of claim 23 wherein the sender is further configured for detecting a need for retransmission of a packet to the receiver, and the retransmission controller is further configured for controlling the packet sender to retransmit the packet to the receiver only before the corresponding retransmission deadline.

31. The system of claim 30 the retransmitted packets comprise MAC packets.

32. The system of claim 31 wherein the retransmission controller is further configured for selecting a retransmission deadline for each MAC packet based on a difference between an actual decoding time deadline determined at the receiver of a video frame and a nominal decoding time.

33. The system of claim 32 wherein:
the receiver includes a difference calculator configured for determining a difference between the actual decoding and presentation time of a video frame to which the MAC packet belongs and the transmission time Tp of the MAC packet, for a current video frame, and transmit said difference to the sender; and
the retransmission controller of the sender is further configured for selecting the retransmission deadline for each MAC packet of a video frame based on the difference.

34. The system of claim 33 wherein the difference calculator is further configured for transmitting said difference to the sender, only if the difference is not the same as that for the previous video frame.

35. The system of claim 31 wherein:
the packet sender is further configured for maintaining a copy of each MAC packet in a sender buffer; and
the retransmission controller is further configured for controlling the packet sender for retransmitting a packet from the buffer to the receiver only before the corresponding retransmission deadline.

36. The system of claim 35 wherein the receiver further comprises a de-packetizer configured for verifying correctness of each packet, and transmitting a positive ACK back to the sender only upon receiving each correct packet.

37. The system of claim 36 wherein the retransmission controller is further configured for controlling the packet sender for retransmitting a packet to the receiver upon the sender not receiving an ACK from the receiver.

38. The system of claim 37 wherein the retransmission controller is further configured for retransmitting a packet to the receiver only before the corresponding retransmission deadline, and if the retransmission deadline has passed, to discard the packet from the buffer.

39. The system of claim 30 wherein the retransmission controller is further configured for selecting a retransmission deadline for each packet by determining an average of said difference for the recent video frames decoded, and selecting a retransmission deadline for each packet as function of said average.

40. The system of claim 23 wherein the sender and the receiver implement a wireless local area network protocol.

41. The system of claim 23 wherein the sender and the receiver implement a type of IEEE 802.11 communication protocol.

42. The system of claim 41 wherein the sender and the receiver implement a type of IEEE 802.11n communication protocol.

43. A video sender for transmitting video information over a communication link to a receiver, comprising:
a processor;
a packet sender configured transmitting encoded video packets to the receiver over the communication link including:
encoding video information into an elemental stream (ES);
packetizing the ES stream into packetized ES (PES) packets;
generating transport stream (TS) packets from each PES packet, wherein each TS packet includes an encoded video payload;
obtaining a presentation time stamp (PTS) indicating the time when each TS packet payload is to be decoded at the receiver; and
assembling the TS packets with PTS, into each media access control (MAC) packet, and transmitting each MAC packet to the receiver; and
a retransmission controller configured for selecting a retransmission deadline for each packet based on an actual decoding time deadline determined at the receiver, and for controlling the packet sender for packet retransmissions, wherein each deadline varies based on a corresponding-receiver decoding time for each packet that carries encoded video information;
wherein the sender and the receiver implement time-constrained video packet communication therebetween.

44. The video sender of claim 43 wherein the retransmission controller is further configured for controlling the packet sender for retransmitting a packet to the receiver only before the corresponding retransmission deadline.

45. The video sender of claim 44 wherein the retransmission controller is further configured for selecting a retransmission deadline for each MAC packet based on a difference between: (a) the required decoding and presentation time Td of a video frame to which the MAC packet belongs, and (b) the transmission time Tp of the MAC packet.

46. The video sender of claim 45 further comprising:
an encoder configured for performing MPEG2 encoding video information into the ES;
a PES packetizer configured for packetizing the ES stream into PES packets; and
a multiplexer configured for generating TS packets from each PES packet, wherein each TS packet includes encoded video payload;
wherein the packet sender is further configured for selecting a presentation time stamp PTS indicating the time when each TS packet payload is to be decoded at the receiver, and for assembling the TS packets with PTS, into each MAC packet, and transmitting each MAC packet to the receiver.

47. The video sender of claim 46 wherein the packet sender is further configured for determining a transmission time Tp of each MAC packet as the sum of a PHY header transmission time and the ratio of the MAC packet length to transmission data rate.

48. The video sender of claim 47 wherein the packet sender is further configured for determining the required decoding and presentation time Td as a function of PTS.

49. The video sender of claim 48 wherein packet sender is further configured for determining Td as:

$Td = PTS + Tos,$ wherein Tos is the time offset between the starting time when the beginning of the video frame sequence is encoded, and the starting time when the beginning of the compressed video frame sequence is passed to a MAC communication component of the sender.

50. The video sender of claim 43 wherein the packet sender is further configured for detecting a need for retransmission of a packet to the receiver, and the retransmission controller is further configured for controlling the packet sender to retransmit the packet to the receiver only before the corresponding retransmission deadline.

51. The video sender of claim 50 wherein the retransmission controller is further configured for selecting a retransmission deadline for each packet that varies based on a corresponding receiver decoding time for each packet that carries encoded video information.

52. The video sender of claim 51 the retransmitted packets comprise MAC packets.

53. The video sender of claim 52 wherein the retransmission controller is further configured for selecting a retransmission deadline for each MAC packet based on a difference between an actual decoding time deadline determined at the receiver of a video frame and a nominal decoding time.

54. The video sender of claim 53 wherein the retransmission controller of the sender is further configured for selecting the retransmission deadline for each MAC packet of a video frame based on the difference between the actual decoding and presentation time of a video frame to which the MAC packet belongs and the transmission time Tp of the MAC packet, for a current video frame.

55. The video sender of claim 52 wherein:
the packet sender is further configured for maintaining a copy of each MAC packet in a sender buffer; and
the retransmission controller is further configured for controlling the packet sender to retransmit a packet from the buffer to the receiver only before the corresponding retransmission deadline.

56. The video sender of claim 55 wherein the retransmission controller is further configured for controlling the packet sender for retransmitting a packet to the receiver upon the sender not receiving an ACK from the receiver.

57. The video sender of claim 56 wherein the retransmission controller is further configured for retransmitting a packet to the receiver only before the corresponding retransmission deadline, and if the retransmission deadline has passed, to discard the packet from the buffer.

58. The video sender of claim 50 wherein the retransmission controller is further configured for selecting a retransmission deadline for each packet by determining an average of said difference for the recent video frames decoded, and selecting a retransmission deadline for each packet as a function of said average.

59. The video sender of claim 43 wherein the sender and the receiver implement a wireless local area network protocol.

60. The video sender of claim 59 wherein the sender and the receiver implement a type of IEEE 802.11 communication protocol.

61. The video sender of claim 60 wherein the sender and the receiver implement a type of IEEE 802.11n communication protocol.

62. A video receiver for receiving video information from a sender over a communication link, comprising:
a processor;
a de-packetizer configured for receiving a video media access control (MAC) packet including encoded video payload, wherein the encoded video packets are transmitted from a sender to the video receiver including:
encoding video information into an elemental stream (ES);
packetizing the ES stream into packetized ES (PES) packets;
generating transport stream (TS) packets from each PES packet, wherein each TS packet includes an encoded video payload;
obtaining a presentation time stamp (PTS) indicating the time when each TS packet payload is to be decoded at the receiver; and
assembling the TS packets with PTS, into each media access control (MAC) packet, and transmitting each MAC packet to the receiver; and
a difference calculator configured for determining a difference between the actual decoding time deadline determined at the receiver and presentation time of a video frame to which the MAC packet belongs and the transmission time Tp of the MAC packet, for a current video frame, and to transmit said difference to the sender, wherein a retransmission deadline for each MAC packet varies based on a corresponding receiver decoding time for each MAC packet that carries encoded video information.

63. The receiver of claim 62 wherein the difference calculator is further configured for transmitting said difference to the sender, only if the difference is not the same as that for the previous video frame.

64. The receiver of claim 62 the depacketizer is further configured for verifying correctness of each packet, and transmit a positive ACK back to the sender only upon receiving each correct packet.

65. The receiver of claim 62 wherein the sender and the receiver implement a wireless local area network protocol.

66. The receiver of claim 62 wherein the sender and the receiver implement a type of IEEE 802.11 communication protocol.

67. The receiver of claim 66 wherein the sender and the receiver implement a type of IEEE 802.11n communication protocol.

* * * * *